(12) United States Patent
Siddiqui et al.

(10) Patent No.: US 8,537,238 B2
(45) Date of Patent: Sep. 17, 2013

(54) DIGITAL CAMERA AND METHOD FOR CAPTURING AND DEBLURRING IMAGES

(75) Inventors: Muhammad Siddiqui, Esslingen (DE); Haroon Farooq Qureshi, Linz (AT); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/079,323

(22) Filed: Apr. 4, 2011

(65) Prior Publication Data
US 2011/0254983 A1    Oct. 20, 2011

(30) Foreign Application Priority Data
Apr. 14, 2010 (EP) .................................... 10159891

(51) Int. Cl.
*H04N 5/228*      (2006.01)
(52) U.S. Cl.
USPC ..................................... 348/222.1; 348/208.6
(58) Field of Classification Search
None
See application file for complete search history.

(56) References Cited

U.S. PATENT DOCUMENTS

| | | | |
|---|---|---|---|
| 2006/0256226 A1* | 11/2006 | Alon et al. | 348/335 |
| 2006/0279639 A1* | 12/2006 | Silverstein et al. | 348/208.14 |
| 2008/0106608 A1* | 5/2008 | Clark et al. | 348/208.99 |
| 2008/0166114 A1 | 7/2008 | Engstrom | |
| 2009/0244300 A1* | 10/2009 | Levin et al. | 348/208.5 |
| 2010/0245602 A1* | 9/2010 | Webster et al. | 348/208.4 |
| 2010/0259670 A1* | 10/2010 | Mohan et al. | 348/349 |
| 2012/0062787 A1* | 3/2012 | Muijs et al. | 348/345 |

OTHER PUBLICATIONS

Ramesh Raskar et al., "Coded Exposure Photography: Motion Deblurring using Fluttered Shutter", ACM Trans. Graph., 2006, 10 Pages.
Anat Levin et al., "Motion-Invariant Photography", ACM Trans. Graph., 2008, 9 Pages.
Michel Sorel, "Recent advances in deblurring and image stabilization", http://zoi.utia.cas.cz/files/ASI2008slides.pdf, 2008, 102 Pages.
Jian-Feng Cai et al., "Blind motion deblurring using multiple images", http://www.math.nus.edu.sg/~matzuows/blind_deblurringl.pdf, 2009, 25 Pages.

* cited by examiner

*Primary Examiner* — Nelson D. Hernández Hernández
*Assistant Examiner* — Dennis Hogue

(57) ABSTRACT

The present invention proposes a digital camera and a corresponding method for capturing and deblurring images which remove several disadvantages of the prior art. In particular, the hardware limitation as well as the motion restriction of the known conventional MIP approach have been overcome. According to the proposed approach, image frames are electronically moved by an electronic frame shifting means. This allows a frame shifting in any type or fashion, wherein no complicated hardware arrangement is needed, as this has been required according to the known conventional MIP approach. The proposed deblurring approach is not limited to any type of frame shifting pattern, and it is furthermore not limited to a one-dimensional motion of the frames, as it also works for the case of a two-dimensional frame motion. Similar as in the conventional Motion Invariant Photography approach, the frame shifting results in a motion-invariant blurred image which can be deconvoluted by a single deconvolution.

15 Claims, 7 Drawing Sheets

DIGITAL CAMERA AND METHOD FOR CAPTURING AND DEBLURRING IMAGES

CROSS-REFERENCE TO RELATED APPLICATIONS

The present application claims priority of European patent application 10159891.0 filed on Apr. 14, 2010.

FIELD OF THE INVENTION

The present invention relates to a digital camera and a method for capturing and deblurring images. The present invention also relates to an image processor for deblurring images and to a corresponding image processing method as well as a computer readable non-transitory medium storing a computer program for implementing said image processing method on a computer.

The present invention particularly relates to the field of digital image processing for eliminating blurring artefacts in digital photographs in order to increase the image quality.

BACKGROUND OF THE INVENTION

Motion blur is a known problem in the field of digital photography which occurs due to unsteady hand movement or when objects are imaged which move with respect to the camera. In case of moving objects, the image is smeared along the direction of relative motion of the object.

Several deblurring techniques are known in the art to deblur a blurred image. One of these techniques is known as short exposure time imaging. Short exposure time imaging, however, raises several challenges. First of all, in case of short exposure time imaging, each individual captured frame is noisy, since lowering the exposure time lowers also the number of photons that reach the photo sensor. Furthermore, since not enough light is captured by the photo sensor, the color tone is also lost.

Modern cameras address the problem of motion blur with an image stabilization technique, where motion sensors control mechanical actuators that shift the sensor or camera lens in real time during the image exposure to compensate for the motion of the camera. However, this approach only compensates for motion blur which occurs due to the camera motion but does not compensate for blurring artefacts which occur due to the motion of the imaged object.

Other deblurring techniques used in conventional cameras are known which make use of a deconvolution of the captured image. However, with these approaches high spatial frequencies are lost because of the box-shaped nature of the camera exposure. This often results in smearing of the high frequency contents. The Fourier spectrum of conventionally used Point Spread Functions (PSF) contains zeros in its spectrum so that the inverse filtering will amplify noise and produce ringing artefacts, thus making the deconvolution an ill-posed problem.

The Flutter Shutter approach proposed by R. RASKAR et al., in "Coded exposure photography: Motion-deblurring using fluttered shutter", published in ACM Trans. Graph., 25 (3): 795-804, 2006 makes the deconvolution problem well-posed due to its broadband filter behaviour. With this approach, the shutter is opening and closing over the exposure time according to a random binary coded sequence. The sequence is chosen such that the resulting motion blur PSF has a flat frequency spectrum and high spatial frequencies are preserved. The Flutter Shutter approach thereby modifies the line segment kernel (typical motion-blur kernel) to achieve a more broadband frequency response, which allows for dramatically improved deconvolution results. This approach, however, relies on user interaction for estimating the correct PSF, since the length and direction of the PSF depends on the object's motion. However, different objects or regions within the captured image may have different motion directions and velocities. Therefore, this technique provides rather good results for imaged objects moving with a known constant velocity. On the other hand, the Flutter Shutter approach has shown inadequate for imaging objects moving with unknown or varying velocity.

A further approach called Motion Invariant Photography (MIP) is disclosed in US 2009/0244300 A1 and A. Levin, P. Sand, T. S. Cho, F. Durand, and W. T. Freeman "Motion-Invariant Photography", ACM Trans. Graph., 27(3): 1-9, 2008. The MIP approach addresses the above-mentioned challenges by mechanically moving the camera or the sensor or lens element during exposure time in such a way that the static and moving parts of the scene likewise become uniformly blurred within a certain range of velocities. With a known kernel, the blur can be removed with a single deconvolution, without the need of any motion estimation and image segmentation. However, the direction of the moving object must still be known. This kind of special mechanical motion of the camera makes the blur invariant of the object's velocity.

By analyzing motion blur as integration in the space-time domain, it is proven that the only integration curve that results in a motion-invariant PSF is a parabola. Therefore, in the MIP approach the camera is mechanically moved according to a one-dimensional parabolic function over time using a special hardware construction. In other words, the movement of the camera follows a parabolic path by moving laterally, initially at a maximum speed and slowing to a stop, and then moving in an opposite direction laterally, increasing in speed to a maximum speed of the range in the opposite direction and finally stopping. During imaging, the mechanically moved camera therefore blurs the entire scene. This blurring is in a manner which is invariant to the velocity of the moving parts within the scene. Since the entire scene, including the static and moving parts, is blurred with an identical PSF, the blur can be removed via a single deconvolution.

However, also the MIP approach shows several disadvantages. First of all, a complicated hardware arrangement is required in order to mechanically rotate the camera (or lens or sensor) in a parabolic fashion. Furthermore, it is not possible, or at least rather complex, to mechanically move the camera, respectively the camera sensor, in a linear fashion, for example, along a V-shaped trajectory. The MIP approach is also limited to a one-dimensional camera motion. Due to the restriction of the one-dimensional camera motion, the direction of the moving parts within the scene must be known in advance before moving the camera along its trajectory, which is again rather disadvantageous.

BRIEF SUMMARY OF THE INVENTION

It is therefore an object of the present invention to provide a digital camera and a method for capturing and deblurring images, which overcome the above-mentioned problems of the prior art and which, in particular, solve one or more of the above explained problems of the MIP approach, i.e. the special hardware requirement, the one-dimensional camera motion restriction, the complexity of performing camera movements along a linear trajectory and the requirement to know the direction of movement of the moving parts within the scene.

According to an aspect of the present invention, there is provided a digital camera comprising:

frame capturing means for capturing a set of frames of a scene, frame shifting means for electronically shifting one or more frames of said set of captured frames relative to each other in a direction parallel to an image plane to obtain a set of shifted frames, image forming means for accumulating the frames of said set of shifted frames and at least one frame of said set of captured frame to obtain a motion-invariant blurred image, and deconvolution means for deconvoluting the motion-invariant blurred image to obtain a deblurred image.

According to another aspect of the present invention, there is provided an image processor comprising such frame shifting means, image forming means and deconvolution means. According to a further aspect of the present invention, there is provided a method for capturing and deblurring images and an image processing method for deblurring images in accordance with the present invention as defined above.

Finally, according to another aspect there is provided computer readable non-transitory medium having instructions stored thereon which, when carried out on a computer, cause the computer to perform the steps of the method.

Preferred embodiments of the invention are defined in the dependent claims. It shall be understood that the claimed digital camera, the claimed image processor, the corresponding methods and the claimed computer program have similar and/or identical preferred embodiments as the claimed digital camera and as defined in the dependent claims.

It has been recognized according to the present invention that by providing frame shifting means for electronically shifting the captured frames to obtain a motion-invariant blurred image after an accumulation of these frames and then by deblurring the blurred image with a single deconvolution, a significantly improved approach compared to the MIP approach disclosed in US 2009/0244300 A1 is realized. In contrast to the MIP approach, the captured frames are no longer shifted by mechanically moving any hardware like the camera, lens or sensor during exposure. According to the present invention, any kind of digital camera can be used to capture a set of frames of the imaged scene. A complicated hardware arrangement for mechanically moving the camera or parts thereof, as is required according to the MIP approach, is no longer needed.

With the proposed approach, the captured frames are electronically shifted, meaning that the image frames captured to obtain the later image are regularly captured by a standard digital camera and afterwards electronically respectively digitally processed by electronic frame shifting means.

Due to this electronic shifting, the hardware limitation as well as the motion restriction of the MIP approach is removed. Compared to the complicated mechanical movement proposed in the MIP approach, an electronic shifting of the captured image frames is much more flexible and better adjustable to any kind of situation within the image. Frames can be moved in any type or fashion instead of a complicated hardware movement of the entire camera or parts thereof, which is inadequate for various movement patterns due to its mechanical motion characteristics.

The frame shifting means of the proposed digital camera can electronically shift the image frames according to any curve so that the frame shifting pattern is not limited to the types of shifting motion proposed in US 2009/0244300 A1. Furthermore, by providing electronic frame shifting means also the number of frames which are being shifted can be varied respectively adjusted according to the specific characteristics of the captured image. For example, if the captured image includes only one moving object, which moves very slowly with a constant velocity so that only minor blurring artefacts are expected, the frame shifting means may only have to shift a small number of image frames in order to obtain a rather good image quality. In such a case, where only a few image frames are being shifted, processing time can be saved. If, for example, the image includes multiple fast moving objects so that severe motion artefacts are expected, the shifting means may be adapted to shift a larger number of frames, respectively to shift the frames in a fashion which is most adequate according to the characteristics of the captured image. This adaption of the frame shifting means may either be done automatically by the camera itself or manually adjusted by the camera user as proposed in embodiments of the invention.

Similar as in the MIP approach, after the frame shift the frames are accumulated by image forming means to obtain a motion-invariant blurred image. This leads to a motion blur invariance with regard to the imaged object's velocity. Since the entire scene thereby becomes uniformly blurred within a certain range of velocities, the blur can be removed using a single deconvolution without the need of any motion estimation or image segmentation. By the proposed image forming means the set of frames, which is used in the accumulation to obtain a motion-invariant blurred image, can also variably be adjusted.

According to one embodiment of the present invention, the image forming means are adapted for accumulating the frames of the set of shifted frames and at least one frame of the set of captured frames. The set of captured frames thereby means the frames, which have originally been captured in un-shifted state. As already mentioned, the number of these un-shifted captured frames, which are further processed in the frame accumulation, can be varied, whereas the set of the shifted frames is usually completely accumulated. It is not necessary to use all frames shifted by the frame shifting means for the accumulation, but frames, which are not used later for the image accumulation, may not be shifted.

According to another embodiment of the present invention the image forming means are adapted for accumulating the frames of said set of shifted frames and the frames of said set of captured frames, which have not been shifted to obtain a motion-invariant blurred image. In other words, according to this embodiment of the invention, all shifted frames are accumulated together with the remaining frames which have been captured by the frame capturing means, which have not been shifted. In this case, all captured frames are accumulated to obtain the motion-invariant blurred image, some of them being shifted and the others not being shifted. In another embodiment it is also possible to accumulate the shifted image frames with their corresponding original (same) frames (that have been used for shifting) in a non-shifted form. This has also shown to result in a deblurred image of rather good quality after deconvolution.

According to a further embodiment of the present invention, the digital camera further comprises frame selection means for selecting a subset of frames of said set of captured frames according to a predetermined selection sequence. The frame selection means thereby select a subset of frames of the set of captured frames, wherein some of the captured frames (not belonging to the subset of frames) are dropped and not further processed. In this case, where frame selection means are included in the digital camera, the selected subset of frames replaces the set of captured frames, so that the shifting means afterwards only shift one or more frames of said subset of frames relative to each other in a direction parallel to an image plane to obtain a set of shifted frames. Selecting a subset of frames, respectively dropping a number of frames, which are not further processed, reduces the data volume processed by the frame shifting means, the image forming means and the deconvolution means and therefore leads to an improved, respectively reduced processing time.

According to this embodiment, the frames are selected according to a predetermined selection sequence, which can be adapted according to the characteristics of the captured image, respectively according to the desired result of the deblurred image. It has been shown that, for example by dropping two or more frames of the set of captured frames according to a predetermined selection sequence, the quality of the deconvolution can be even increased, which leads to a further improvement of the deblurred image. The selection sequence can be imagined as a binary-coded sequence comprising values of 0 and 1, wherein 0 indicates that a frame should be dropped and 1 indicates that a frame should be kept and further processed. However, the present invention is not limited to such a coded sequence, but can also comprise any other type of sequence allowing a dropping and/or weighting of the captured frames.

In practical implementations of the present invention, the number of frames to be dropped is usually kept to a minimum, since dropping of too many frames would otherwise lead to a loss of light in the resulting image. For symmetry reasons the total number of captured frames is preferably selected to be an odd number. Preferably two of these captured frames are then dropped within the selection sequence. The first, the last and the middle frame of the frame sequence are usually kept, i.e. not dropped, since this would otherwise disturb the shape of the selected shifting curve of the frames. In other words this means that preferably at minimum two frames and at maximum all except three frames (the first, the last and the middle frame) are dropped and not further processed.

In order to select the optimal frames to be dropped, an algorithm is preferably applied where different frames are dropped step by step and the resulting spectrum of the point spread function (PSF) of the shifted (further processed) frames is compared to each other. Note that PSF is understood as the function describing the response of an imaging system to a point source or point object, i.e. the system's impulse response. According to the algorithm, the selection sequence which results in a spectrum of the PSF with the minimal variance and the highest minimum value is selected to be the optimal selection sequence, since it is usually desired that the spectrum of the PSF varies respectively drops as little as possible in order to avoid smearing of high-frequency information.

Taking, for example, the case of nine captured frames, the selection algorithm would start to drop frames 2 and 8, since, as already mentioned above, frames 1, 5 and 9 are usually never dropped and the resulting subset of further processed frames should be symmetric. Then, the spectrum of the PSF of the resulting frame subset (including frames 1, 3-7, 9) is evaluated with respect to the spectral variance and the maximum and minimum values. In the second step frames 3 and 7 would be dropped and the respective spectrum of the PSF of the second frame subset (including frames 1-2, 4-6, 8-9) is analyzed. Finally, frames 4 and 6 would be dropped and again the respective spectrum of the PSF of the third frame subset (including frames 1-3, 5, 7-9) is analyzed. By comparing the evaluated PSF spectra of the three frame subsets with each other it is, according to the above mentioned criteria, decided which frame subset is optimal, i.e. which two frames should be optimally dropped. This decision is preferably done by selecting the frame subset showing the minimum variance of the spectrum, the highest minimum value of the spectrum, and/or the least enhancement of deconvolution noise.

It has to be noted that the above mentioned selection sequence and selection algorithm do not only apply for a one-dimensional shifting pattern of the frames. This selection sequence and selection algorithm applies also for a two-dimensional shifting pattern of the frames.

The proposed dropping and not further processing of some of the captured frames furthermore leads to comparable advantages as in the coded exposure (Flutter Shutter) approach. In contrast to the Flutter Shutter approach, the undesired frames are electronically sorted out after they have been captured instead of mechanically creating the flutter due to the shutter motion. Instead of a random selection of the frames (as in the Flutter Shutter approach), this approach allows a well-defined selection of the frames according to an individually adjustable selection sequence.

According to another preferred embodiment the frame shifting means are adapted for electronically shifting one or more frames of said set of captured frames relative to each other in a direction parallel to an image plane along a predetermined shifting pattern. Depending on the number and specific form of the frames, the frames can be shifted in any fashion along a predetermined shifting pattern. The shifting pattern can be any pattern, which is either set up automatically or manually defined by the user. This allows shifting the frames either along a predetermined or a manually selected trajectory, respectively along an individually selectable pattern.

According to the proposed approach using electronic shifting of the frames, the frame shifting is, in contrast to the MIP approach, not only limited to a one-dimensional shifting of the frames. A two-dimensional motion of the frames can also easily be realized by the frame shifting means. Therefore, the frame shifting means are, according to a further preferred embodiment of the present invention, adapted for electronically shifting one or more frames of said set of captured frames relative to each other in a direction parallel to an image plane along a one- or two-dimensional shifting pattern. Two-dimensional here means a two-dimensional motion in space. In contrast to the conventional MIP approach, where the frames are only shifted along a one-dimensional trajectory (by shifting the camera), according to the present invention there is no more need to know the direction and magnitude of the moving parts within the scene, since the frames can be electronically shifted in two dimensions so that the deconvolution becomes independent of the direction of motion of the captured image object. In other words, the presented approach is direction independent. In contrast thereto, according to the conventional MIP approach the direction of motion of the captured image object must be known or estimated (which may be sometimes complicated), since the one-dimensional frame shifting approach is only motion-invariant, but not direction independent. However, a two-dimensional motion in space is not even possible or would at least be associated with major mechanical difficulties within the conventional MIP approach.

According to a further embodiment of the present invention, it is particularly preferred that the frame shifting means are adapted for electronically shifting one or more frames of said set of captured frames relative to each other in a direction parallel to an image plane along a one- or two-dimensional V-shaped trajectory or along a one or two-dimensional parabolic or U-shaped trajectory. Due to its perfectly linear properties, a V-shaped trajectory is especially preferable. Since the deconvolution is easily adaptable to such a linear curve, a perfect V-shaped linear curve has shown to result in a rather good image quality. However, due to the restrictions of motion of the mechanical camera movement system in the conventional MIP approach, this has not been possible before. A perfectly V-shaped curve could not be established by mechanically moving the camera.

The advantage of a parabolic trajectory is the fact that PSF remain the same over the entire image.

According to another embodiment of the present invention, the deconvolution means are adapted for deconvoluting the motion-invariant blurred image using a predetermined point spread function. The point spread function (PSF) is used to deblur the image, which has been blurred by the frame shifting means before. According to a further embodiment of the present invention, the PSF is preferably determined according to the shifting pattern. In case of a two-dimensional shifting pattern, the PSF can be controlled according to the shifting pattern in such a way that it will not vary with the speed of the movement of the moving parts within the scene. In contrast to the conventional MIP approach, the PSF does therefore not have to be estimated in advance, which is not only easier to handle, but also more effectively avoids smearing of the moving objects within the image. It has also been shown that, compared to other known approaches, the proposed deblurring technique preserves more high frequency spatial details.

Finally, a further improvement can be realized by determining the point spread function according to the number and characteristics of the accumulated frames. The PSF is therefore optimally adapted to the image processing and deblurring method.

According to another aspect the present invention provides a digital camera comprising:
 a frame capturing unit that captures a set of frames of a scene,
 a frame shifter that electronically shifts one or more frames of said set of captured frames relative to each other in a direction parallel to an image plane to obtain a set of shifted frames,
 an image former that accumulates the frames of said set of shifted frames and at least one frame of said set of captured frames to obtain a motion-invariant blurred image, and
 a deconvolution unit that deconvolutes the motion-invariant blurred image to obtain a deblurred image.

According to still another aspect the present invention provides an image processor comprising:
 a frame shifter that electronically shifts one or more frames of a set of image frames relative to each other in a direction parallel to an image plane in order to receive a set of shifted frames,
 an image former that accumulates one or more frames of said set of image frames and/or said set of shifted frames in order to obtain a motion-invariant blurred image, and
 a deconvolution unit the motion-invariant blurred image in order to receive a deblurred image.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
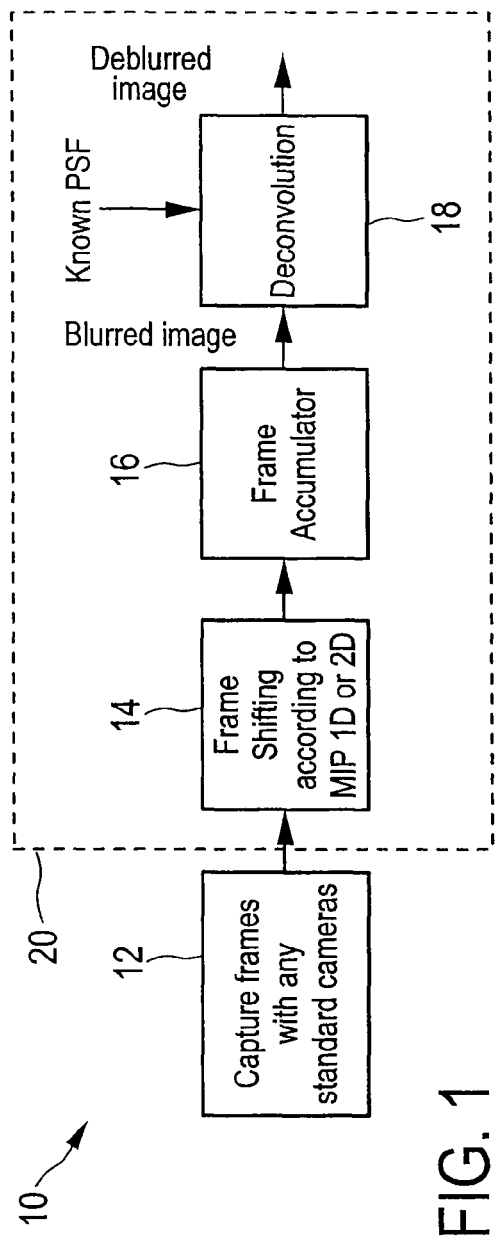
FIG. 1 shows a schematic block diagram of a first embodiment of a digital camera according to the present invention.

FIG. 1 shows a schematic block diagram of a first embodiment of a digital camera 10 according to the present invention. The digital camera 10 comprises frame capturing means 12 for capturing a set of image frames of a scene, frame shifting means 14 for electronically shifting one or more frames of said set of captured frames to obtain a set of shifted frames, and image forming means 16 for accumulating the frames which have been shifted by the frame shifting means 14, respectively also at least one non-shifted frame of said set of frames captured by the capturing means 12, to obtain a motion-invariant blurred image. Finally, the digital camera comprises deconvolution means 18 for deconvoluting the motion-invariant blurred image to obtain a deblurred image.

In a practical use, first a set of frames of a scene is captured by the frame capturing means 12. The frame capturing means 12 can for example be any standard digital camera. Without the subsequent deblurring processing an image, which is accumulated from the captured frames, would show blurring artefacts if objects are being imaged which move within the scene during the camera exposure. Therefore, image processing means 20 are provided to deblur the image to obtain a high-quality image without blurring artefacts. The frame shifting means 14 electronically shift one or more captured frames relative to each other in a direction parallel to an image plane along a selectively adjustable shifting pattern. This means that the captured frames are being shifted in the space-time domain. Due to this frame shifting, the whole imaged scene, including static and moving parts, becomes uniformly blurred within a certain range of velocity when the frames are accumulated in the subsequent accumulation step performed by the image forming means 16. This kind of special frame shifting creates a blur which is invariant to the velocities of the moving objects within the scene and which can therefore be removed with a single deconvolution in the deconvolution means 18.

In contrast to the known MIP approach disclosed in US 2009/0244300 A1, the frames are electronically shifted by the frame shifting means 14 instead of realizing a frame shift by mechanically moving the camera during exposure as in the known MIP approach. Therefore, a complicated hardware arrangement for mechanically moving the camera is not necessary according to the present invention. An electronic frame shift in this case means that the frames regularly captured by the frame capturing means 12 (by a standard digital camera) are digitally shifted along an imaginary shifting pattern within the electronic frame shifting means 14. The image frames can therefore be shifted along any desired curve within the space-time domain, wherein the frame shifting pattern/curve is not limited to the types of shifting motion proposed in US 2009/0244300 A1.

Figure 4:
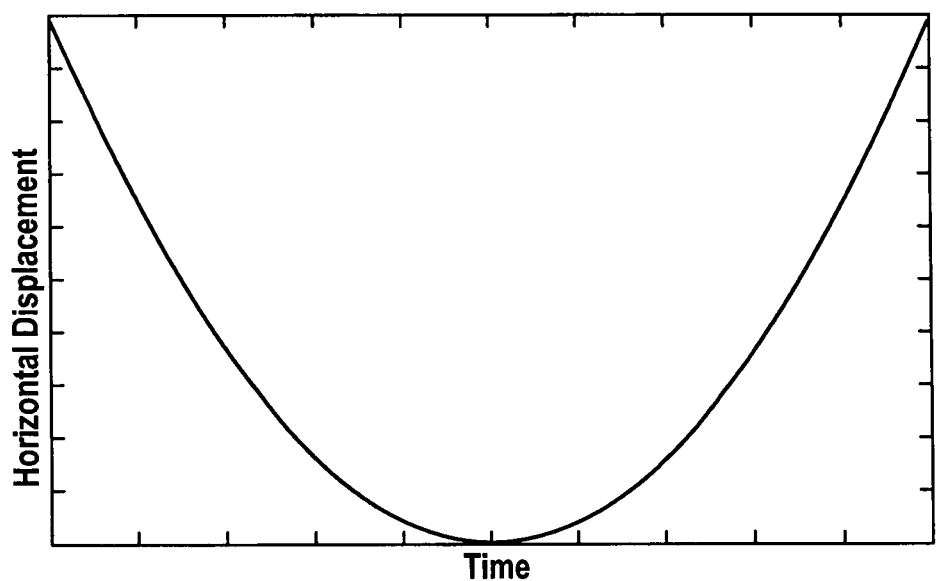
FIG. 4 shows a diagram illustrating a first one-dimensional frame shifting pattern according to the present invention.
Figure 5:
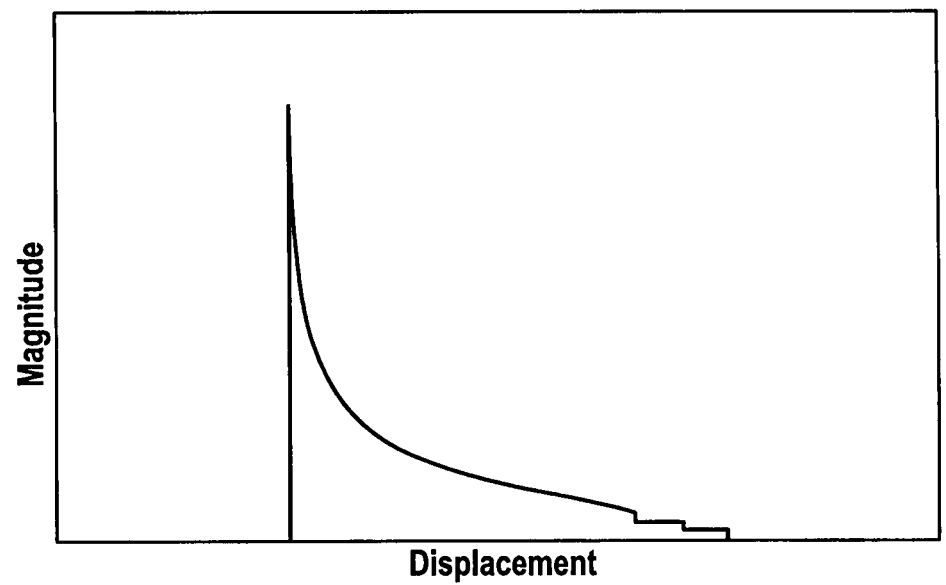
FIG. 5 shows a diagram illustrating a point spread function according to the first one-dimensional frame shifting pattern shown in FIG. 4.

Due to the electronic shifting approach of the frame shifting means 14, the frames can be shifted in a very exact manner. Rather good image results have, for example, been shown for a frame shifting pattern along a parabolic curve, as illustrated in FIG. 4. By analyzing motion blur as integration in the space-time domain, it is proven that a blurred image, which has been created by accumulating image frames that have been shifted along a parabolic shifting pattern can be deconvoluted by an invertible, motion-invariant PSF, as shown in FIG. 5. Within the deconvolution means 18, the PSF can thus be exactly determined according to the specific shifting pattern (here, according to the parabolic shifting curve).

The mathematical background for the determination of the PSF according to the specific shifting pattern can be taken from US 2009/0244300 A1, in particular from paragraphs [0032]-[0048] of US 2009/0244300 A1, where the derivation of the PSF is described for the conventional MIP approach. Apart from the already above mentioned difference, that within the conventional MIP approach the whole camera is moved along a predetermined movement pattern, whereas according to the present invention the image is captured with a static camera and the captured frames of the imaged scene are afterwards electronically shifted, the derivation for the PSF given in the above mentioned paragraphs of US 2009/0244300 A1 can also be applied here with only minor adaptions.

Figure 6:
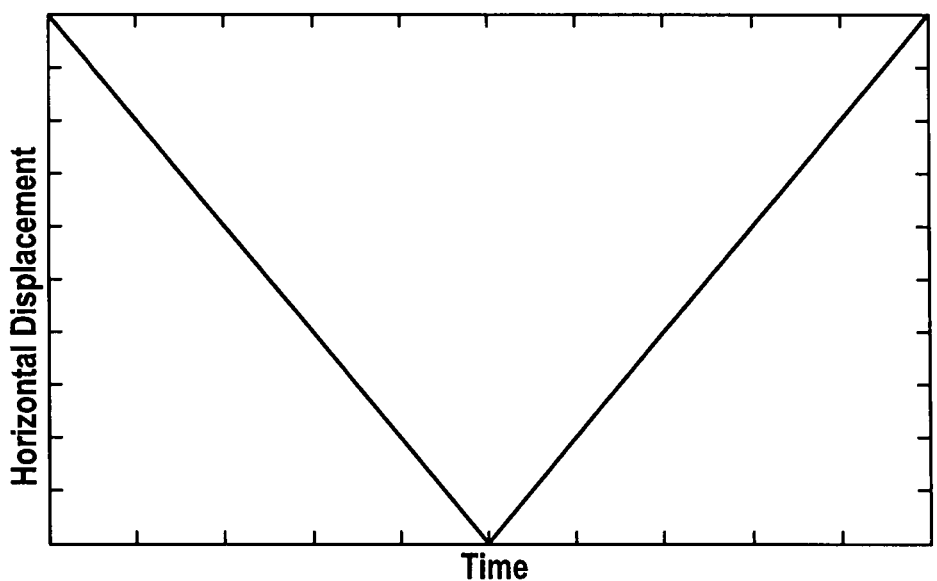
FIG. 6 shows a diagram illustrating a second one-dimensional frame shifting pattern according to the present invention.
Figure 7:
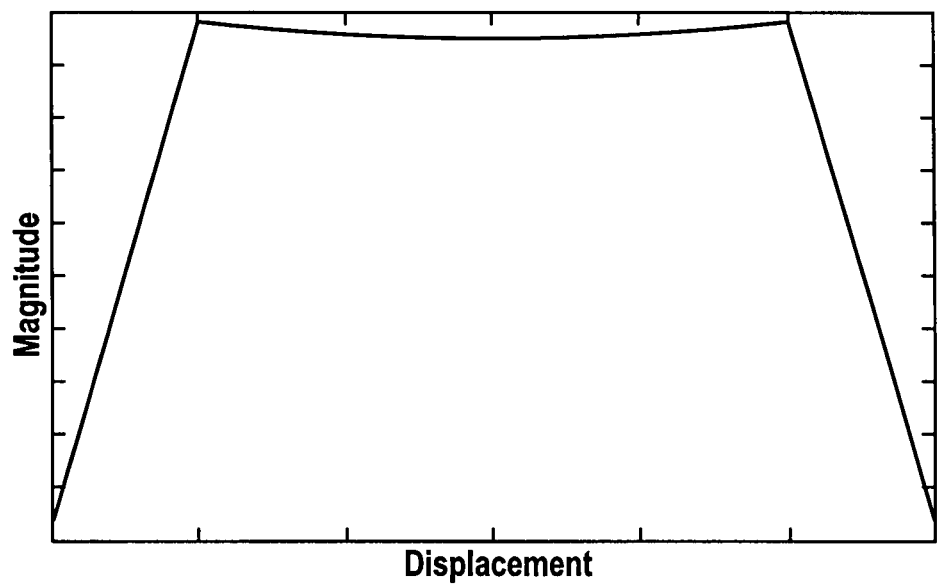
FIG. 7 shows a diagram illustrating the point spread function according to the second one-dimensional frame shifting pattern shown in FIG. 6.

A V-shaped linear frame shifting curve, as shown in FIG. 6, has also shown to result in a rather good image quality, since the PSF (see FIG. 7) is also easy to determine. Additionally, such a V-shaped linear shifting curve can be easily accomplished by the electronic frame shifting means 14. In contrast, this has, due to the motion restrictions, not been possible according to the conventional MIP approach.

Figure 8:
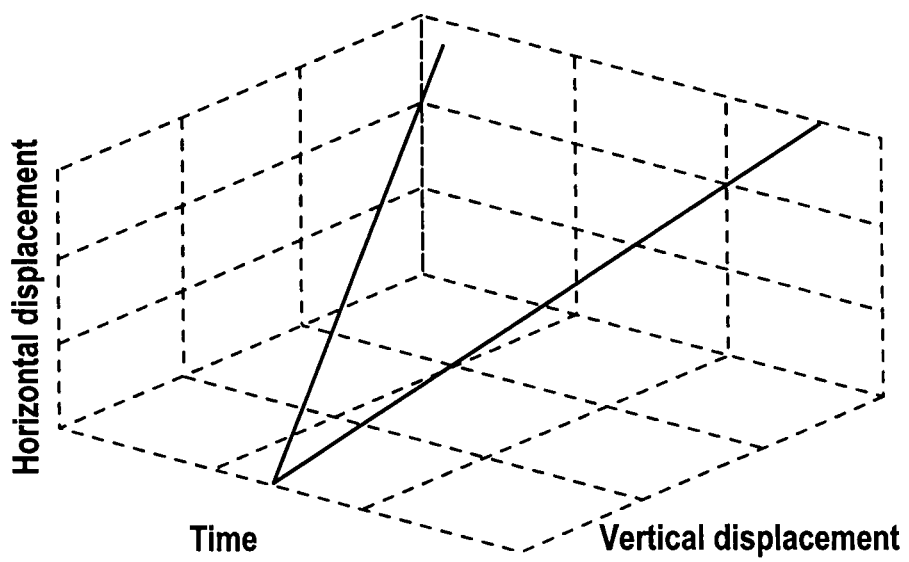
FIG. 8 shows a diagram illustrating a first two-dimensional frame shifting pattern according to the present invention.
Figure 9:
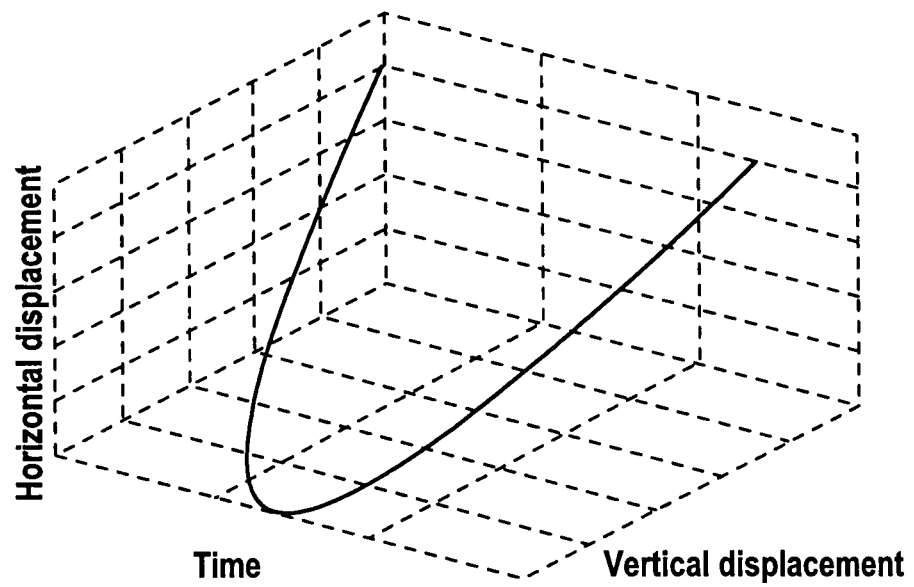
FIG. 9 shows a diagram illustrating a second two-dimensional frame shifting pattern according to the present invention.

Due to the electronic shifting approach, it is even possible to perform a two-dimensional shifting pattern. FIG. 8 exemplarily shows a two-dimensional V-shaped shifting pattern, and FIG. 9 shows an exemplary two-dimensional parabolic shifting pattern. The main advantage of such two-dimensional shifting patterns is that the PSF does not have to be estimated anymore in advance. This is not only easier to handle, it also avoids smearing of the moving objects within the scene, which occurs when the PSF is not correctly or optimally optimized. The mathematical derivation of the PSF itself, however, stays the same for the two-dimensional case. Therefore, the above mentioned mathematical background also applies in the two-dimensional case.

It has to be noted that the frame shifting means 14, the image forming means 16 and the deconvolution means 18 can either be directly integrated into the digital camera, or they can be included in an external image processor 20. To give an illustrating example, the image processor 20 may be part of the image processor of the digital camera 10 itself (as shown in FIG. 1), or, in the alternative case, the picture is first taken by a standard camera and then the captured images are transferred to an external image processor which deblurs the captured images and improves the image quality at a later point in time.

Figure 2:
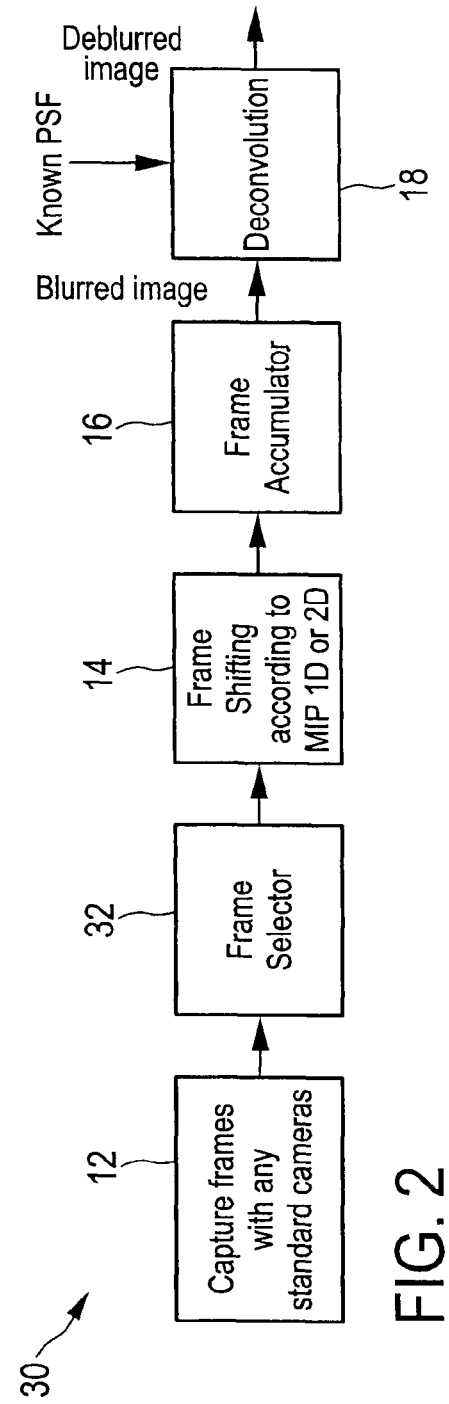
FIG. 2 shows a schematic block diagram of a second embodiment of the digital camera according to the present invention.

A second embodiment of the digital camera according to the present invention is shown in FIG. 2 in a schematic block diagram. This embodiment of a digital camera 30 additionally includes frame selection means 32 which, in the block diagram of FIG. 2, are included between the frame capturing means 12 and the image forming means 16. The remaining means 12, 14, 16, 18 of the second embodiment 30 correspond to the respective means provided in the camera 10 according to the first embodiment. The frame selection means 32, also called frame selector, are adapted for selecting a subset of frames of the captured frames according to a predetermined selection sequence. The frame selection means 32 thereby select a subset of frames of the set of captured frames, wherein some of the captured frames (not belonging to the subset of frames) are dropped and not further processed. The selected subset of frames then replaces the set of captured frames, so that only the selected subset of frames is transferred to the shifting means, which then shift one or more frames of said subset to obtain a set of shifted frames. Apart from that, the frame shifting procedure performed by the frame shifting means 14 corresponds to the above-explained approach.

The incorporation of frame selection means 32 has several advantages. First of all, the processing time can be reduced, since a number of frames are actively dropped and not further processed, which again reduces the data volume which has to be processed. Second, it has been shown that by selecting specific frames according to a predetermined selection sequence, which is adaptable to the image/scene characteristics, the quality of the deconvolution can be increased, so that a further improved deblurred image can be realized. This leads to comparable advantages as shown in the coded exposure (Flutter Shutter) approach. Since, according to the proposed approach, undesired frames are electronically sorted out after they have been captured, the proposed approach allows for an optimal selection of the frames according to an individually adjustable selection sequence.

Figure 10:
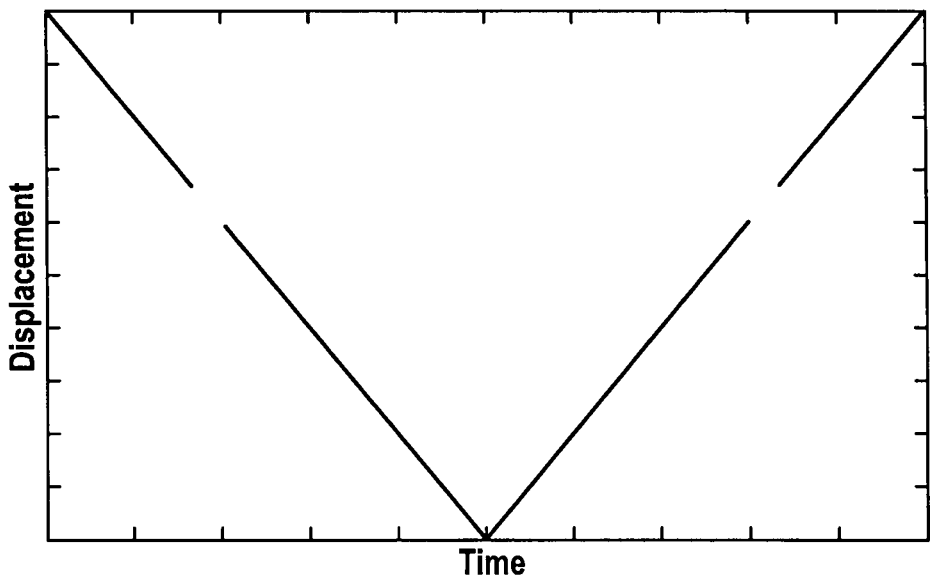
FIG. 10 shows a diagram illustrating a third one-dimensional frame shifting pattern according to the present invention.
Figure 11:
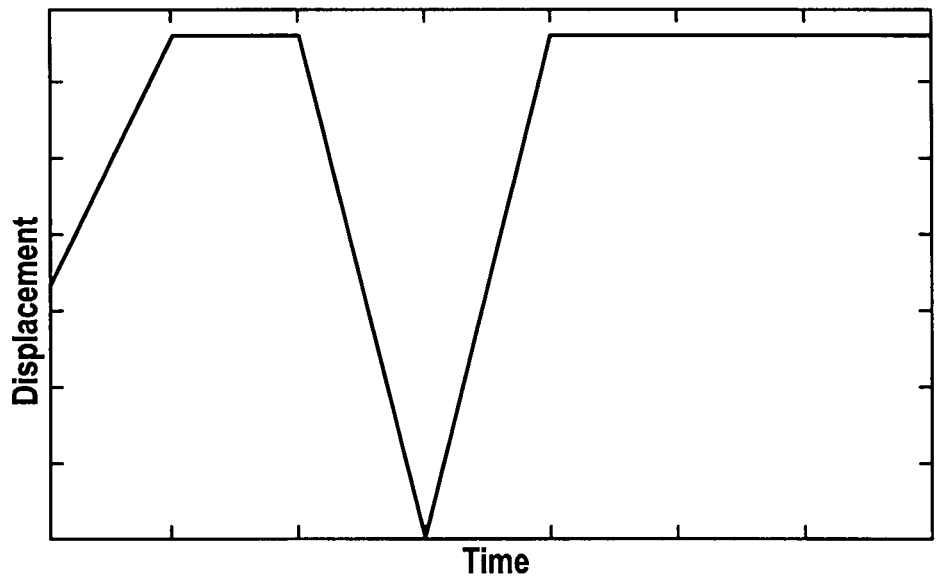
FIG. 11 shows a diagram illustrating the point spread function according to the third one-dimensional frame shifting pattern shown in FIG. 10.

For example, it has been shown that dropping two or more frames of the set of captured frames subsequently leads to a rather good image improvement. A V-shaped frame shifting pattern where several frames have been dropped (illustrated by gaps in the V-shaped curve) is shown in FIG. 10. The corresponding PSF is shown in FIG. 11. The PSF shown in FIG. 11 is also motion-invariant and easy to invert, so that the deconvolution can, also in the case of an included frame selector 32, be performed in the same reliable manner as explained above according to the first embodiment of the present invention.

Figure 3:
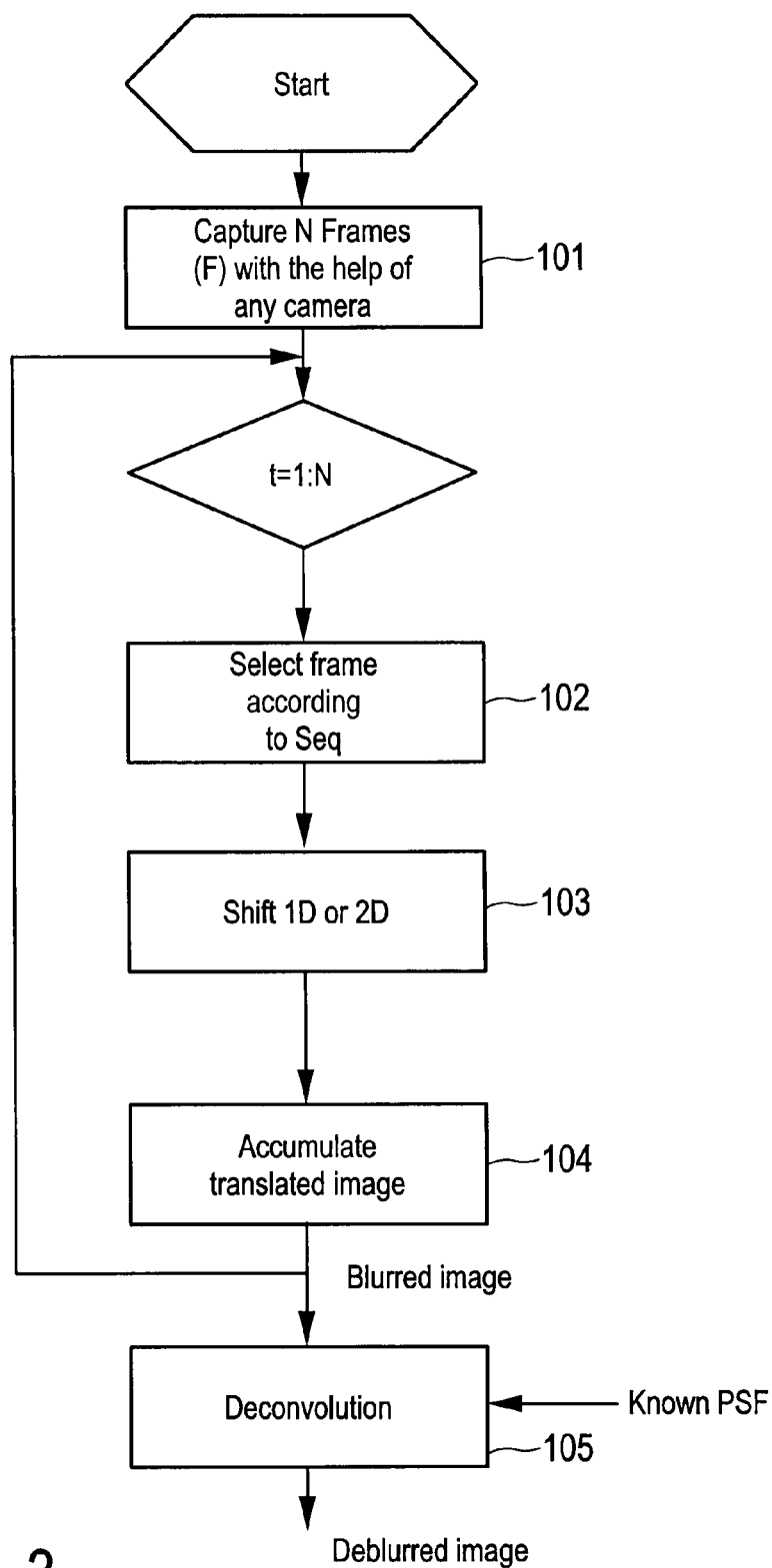
FIG. 3 shows a schematic block diagram of the corresponding method for capturing and deblurring images according to the second embodiment of the present invention.

The proposed method for capturing and deblurring images, which corresponds to the presented digital camera, is shown in a schematic block diagram in FIG. 3. In the first step 101, a set of N image frames is captured by use of a regular digital camera. Each frame is then, step by step, individually processed. In step 102, the frames which shall be further processed are selected, and undesired frames are dropped. In the next step 103, the frames are electronically shifted in a direction parallel to an image plane. As explained above, any one- or two-dimensional shifting pattern can be realized. It also has to be noted that it is not mandatory that every frame is shifted in step 103, i.e. it can be meaningful that the first and last frame remain un-shifted. In step 104, the motion-invariant blurred image is created by accumulating the resulting frames (shifted and/or non-shifted frames). In the last step 105, the blurred image is deconvoluted using the known, respectively determined PSF to finally obtain the deblurred image.

In summary, a new approach for capturing and deblurring images has been proposed which removes several disadvantages of the known MIP approach, in particular the hardware limitation as well as the motion restriction. With the proposed approach, image frames can be moved in any type or fashion instead of requiring a complicated hardware for the camera motion, as this has been required according to the known conventional MIP approach. The proposed deblurring approach is not limited to any type of frame shifting pattern, and it is furthermore not limited to a one-dimensional motion of the frames, as it also works for the case of a two-dimensional frame motion.

Figure 12:
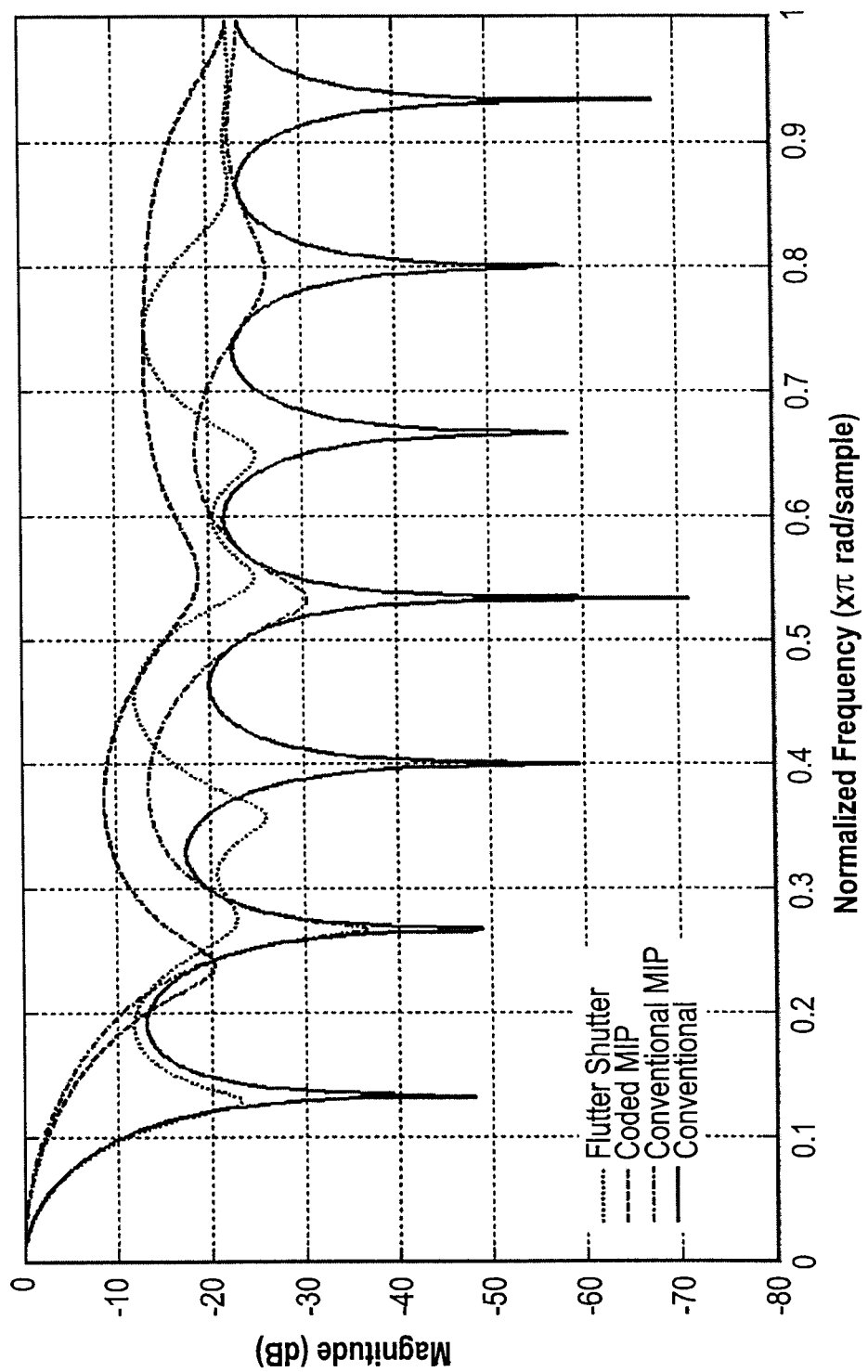
FIG. 12 shows a diagram illustrating a spectrum plot comparing the capturing and deblurring technique according to the present invention with other capturing and deblurring techniques of the prior art.

Overcoming these disadvantages of the prior art, is has been shown that the proposed approach preserves, in comparison to the known Flutter Shutter approach and the conventional MIP approach as well as the conventional deblurring techniques, more high frequency spatial details as can be derived from FIG. 12.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article ("a" or "an") does not exclude a plurality. A single element or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A digital camera comprising:
circuitry configured to
capture a set of frames of a scene,
electronically shift one or more frames of said set of captured frames relative to each other in a direction parallel to an image plane along a predetermined shifting pattern to obtain a set of shifted frames,
accumulate the frames of said set of shifted frames and at least one frame of said set of captured frames to obtain a motion-invariant blurred image having a blur that is invariant to the motion of moving objects in the scene, and
deconvolute the motion-invariant blurred image to obtain a deblurred image.

2. The digital camera as claimed in claim 1, wherein the circuitry is further configured to accumulate the frames of said set of shifted frames and the frames of said set of captured frames which have not been shifted to obtain a motion-invariant blurred image.

3. The digital camera as claimed in claim 1, wherein the circuitry is further configured to select a subset of frames of said set of captured frames according to a predetermined selection sequence.

4. The digital camera as claimed in claim 1, wherein the circuitry is further configured to electronically shift one or more frames of said set of captured frames relative to each other in a direction parallel to an image plane along the predetermined shifting pattern.

5. The digital camera as claimed in claim 1, wherein the circuitry is further configured to electronically shift one or more frames of said set of captured frames relative to each other in a direction parallel to an image plane along a one or two dimensional shifting pattern as the predetermined shifting pattern.

6. The digital camera as claimed in claim 1, wherein the circuitry is further configured to electronically shift one or more frames of said set of captured frames relative to each other in a direction parallel to an image plane along a one or two dimensional linear shifting pattern, in particular along a V-shaped trajectory, or along a one or two dimensional parabolic or U-shaped trajectory as the predetermined shifting pattern.

7. The digital camera as claimed in claim 1, wherein the circuitry is further configured to deconvolute the motion-invariant blurred image using a predetermined point spread function.

8. The digital camera as claimed in claim 7, wherein the circuitry is further configured to determine the point spread function according to the predetermined shifting pattern.

9. The digital camera as claimed in claim 7, wherein the circuitry is further configured to determine the point spread function according to the number and characteristics of the accumulated frames.

10. A method for capturing and deblurring images, the method comprising:
capturing a set of frames of a scene,
electronically shifting one or more frames of said set of captured frames relative to each other in a direction parallel to an image plane along a predetermined shifting pattern to receive a set of shifted frames,
accumulating one or more frames of said set of captured frames and/or said set of shifted frames in order to obtain a motion-invariant blurred image having a blur that is invariant to the motion of moving objects in the scene, and
deconvoluting the motion-invariant blurred image to obtain a deblurred image.

11. An image processor comprising:
circuitry configured to
electronically shift one or more frames of a set of image frames relative to each other in a direction parallel to an image plane along a predetermined shifting pattern to obtain a set of shifted frames,
accumulate one or more frames of said set of image frames and/or said set of shifted frames in order to obtain a motion-invariant blurred image having a blur that is invariant to the motion of moving objects in the scene, and
deconvolute the motion-invariant blurred image to obtain a deblurred image.

12. An image processing method comprising:
electronically shifting one or more frames of a set of image frames relative to each other in a direction parallel to an image plane along a predetermined shifting pattern to obtain a set of shifted frames, accumulating one or more frames of said set of image frames and/or said set of shifted frames in order to obtain a motion-invariant blurred image having a blur that is invariant to the motion of moving objects in the scene, and deconvoluting the motion-invariant blurred image to obtain a deblurred image.

13. A computer readable non-transitory medium having instructions stored thereon which, when carried out on a computer, cause the computer to perform the steps of the method as claimed in claim 12.

14. A digital camera comprising:

means for capturing a set of frames of a scene, means for electronically shifting one or more frames of said set of captured frames relative to each other in a direction parallel to an image plane along a predetermined shifting pattern to obtain a set of shifted frames, means for accumulating the frames of said set of shifted frames and at least one frame of said set of captured frames to obtain a motion-invariant blurred image having a blur that is invariant to the motion of moving objects in the scene, and means for deconvoluting the motion-invariant blurred image to obtain a deblurred image.

15. An image processor comprising:

means for electronically shifting one or more frames of a set of image frames relative to each other in a direction parallel to an image plane along a predetermined shifting pattern in order to receive a set of shifted frames, means for accumulating one or more frames of said set of image frames and/or said set of shifted frames in order to obtain a motion-invariant blurred image having a blur that is invariant to the motion of moving objects in the scene, and means for deconvoluting the motion-invariant blurred image to obtain a deblurred image.

\* \* \* \* \*